US006714326B1

(12) United States Patent
Yamada

(10) Patent No.: US 6,714,326 B1
(45) Date of Patent: Mar. 30, 2004

(54) IMAGE READING APPARATUS AND IMAGE PROCESSING APPARATUS

(75) Inventor: Masakatsu Yamada, Ibaraki-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 513 days.

(21) Appl. No.: 09/636,706

(22) Filed: Aug. 11, 2000

(30) Foreign Application Priority Data

Aug. 24, 1999 (JP) ............................................. 11-236891

(51) Int. Cl.$^7$ ........................... H04N 1/04; B65H 31/00; B65H 31/04
(52) U.S. Cl. ........................ 358/498; 358/474; 271/207; 271/213
(58) Field of Search ................................ 358/498, 474; 271/207, 213

(56) References Cited

U.S. PATENT DOCUMENTS

| 4,754,337 | A |   | 6/1988 | Nohtomi et al. ............. 358/286 |
| 5,234,212 | A | * | 8/1993 | Dutra, Jr. .................... 271/207 |
| 5,379,121 | A |   | 1/1995 | Yamada et al. ............. 358/400 |
| 5,420,701 | A |   | 5/1995 | Terashima et al. .......... 358/498 |
| 5,448,374 | A |   | 9/1995 | Yokoyama et al. ......... 358/400 |
| 5,452,095 | A |   | 9/1995 | Ono et al. .................. 358/296 |
| 5,523,858 | A |   | 6/1996 | Yamada et al. ............. 358/412 |
| 5,701,547 | A |   | 12/1997 | Yamada et al. ................ 399/1 |
| 5,706,101 | A |   | 1/1998 | Yokoyama et al. ......... 358/400 |
| 5,737,097 | A |   | 4/1998 | Fujimoto .................... 358/476 |
| 5,825,505 | A |   | 10/1998 | Toyoda et al. .............. 358/400 |
| 5,896,206 | A |   | 4/1999 | Kellogg ...................... 358/498 |
| 5,915,157 | A |   | 6/1999 | Takenaka et al. ........... 399/361 |
| 6,064,498 | A | * | 5/2000 | Taniguchi et al. .......... 358/498 |

FOREIGN PATENT DOCUMENTS

| EP | 0 817 459 A2 | 1/1998 |
| EP | 0 830 001 A2 | 3/1998 |

* cited by examiner

Primary Examiner—Edward Coles
Assistant Examiner—Houshang Safaipour
(74) Attorney, Agent, or Firm—Fitzpatrick, Cella, Harper & Scinto

(57) ABSTRACT

A conventional type of an image processing apparatus having the functions both a facsimile and a printer needs certain space around the apparatus since parts like trays are protruded from the apparatus. Furthermore, in that kind of apparatus, since there are unnecessary keypads in equipped keypads on operation panels, the unnecessary keypads bring bad appearance of the apparatus. The present invention is to provide an image reading apparatus or processing apparatus that allows parts like a document output tray to be accommodated compactly, not obstructive but good appearance in terms of design.

17 Claims, 10 Drawing Sheets

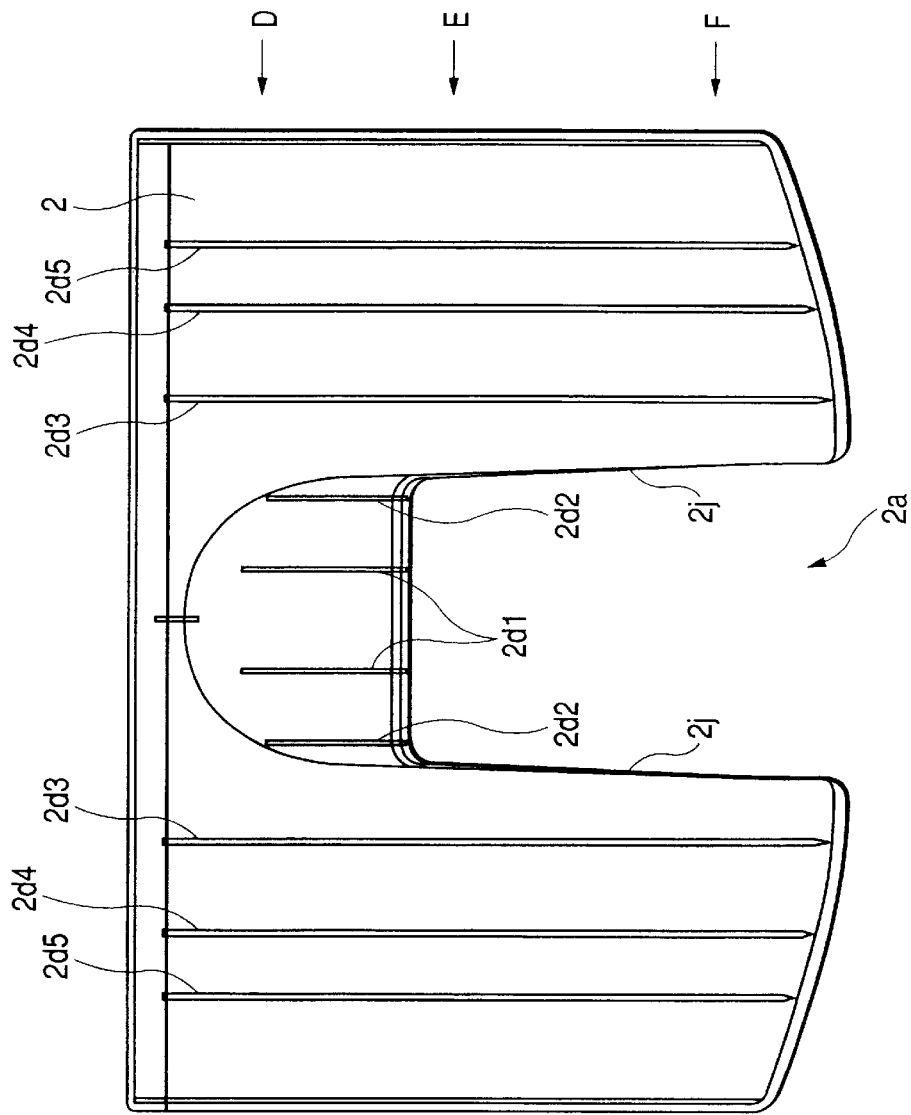

IMAGE READING APPARATUS AND IMAGE PROCESSING APPARATUS

BACKGROUND OF THE INVENTION

1. Field of the Invention

The present invention relates to an image processing apparatus equipped with functions not only as a facsimile with a copier function but also as a printer and scanner by connecting to a host computer.

2. Related Background Art

FIG. 10 shows an example of an image processing apparatus that can be used not only as a facsimile with a copy function but also as a printer or scanner by connecting to a computer. This image processing apparatus integrates an image reading apparatus that reads the image of a document and a recording apparatus that records the image on recording paper as one body.

In this drawing, an operation panel 110 is provided frontward on the upper surface of the apparatus (operator side). The operation panel 110 is equipped with a numeric keypad 111 to enter telephone numbers or the number of copies, etc., an LCD 112 that displays statuses of the apparatus and information on various settings, an alarm display 113 that denotes the presence of an error in the apparatus, one-touch keys 114 that allow various settings to be performed in function mode or allow a communication with the other end of the line registered normally with a single keystroke and operation keys 115 that perform operations like execution and stop.

A reading section is provided below the operation panel 110 and a document placed on a document setting section 120 passes through the reading section and ejected from a document ejection port 122 after reading and loaded in on document output tray 123.

The document output tray 123 can be drawn in the direction shown by an arrow A. When not used, the document output tray 123 can be retracted in order to keep space in front as shown in this drawing. That is, protrusion from the apparatus can be minimized. When a document is read, the document output tray 123 is drawn out.

A recording section is provided below the document setting section 120 and the recording paper placed in a recording paper setting section 130 passes through the recording section and is ejected from a recording paper ejection port 132 below the reading section. Reference numeral 133 denotes a recording paper loading tray to load the ejected recording paper.

When such an image processing apparatus is used independently as a standalone unit, for example, in the case where facsimile transmission or copying is performed, the operation is started by operating the various keys on the operation panel 110. Moreover, in the case where the image processing apparatus is used connected with a computer, various operations can be performed from the computer, and therefore it is possible to start the operation without the need for operating the various keys on the operation panel 110.

However, the configuration of the above-described image processing apparatus has a disadvantage that the document output tray is obtrusive when the document output tray is not used. That is, even if the document output tray is retracted, it still protrudes approximately 100 mm out of the apparatus.

In order to overcome this disadvantage, the document output tray may be completely retracted into the apparatus. However, the disadvantage is that the document output tray has a length of 200 mm or more and it interferes with the recording section inside the apparatus. Solving this problem will require the depth of the apparatus to be extended, which will increase the size of the apparatus.

Furthermore, the numeric keypad, one-touch keys and operation keys on the operation panel are the keys necessary especially when the apparatus is used as a facsimile or copier, which is supposed to be used as an independent apparatus, but these are unnecessary keys when, for example, the apparatus is used as a printer for the output from the computer or during facsimile reception. Nevertheless, showing many unnecessary keys all the time brings not only bad appearance in terms of design but also gives a user an impression that it seems difficult to operate more than necessary. Moreover, those keys raise a possibility of touching the keys carelessly, causing erroneous operations.

SUMMARY OF THE INVENTION

It is an object of the present invention to provide an image reading apparatus and image processing apparatus that will allow the document output tray to be accommodated compactly, not obtrusive while it is accommodated inside the apparatus, but good appearance in terms of design, not giving an impression that it is difficult to operate more than necessary and not causing erroneous operations of the apparatus.

The present invention has been implemented taking into account the above-described situations, is characterized by comprising a document holder that holds document sheets, document transporting means that transports the documents, reading means that reads information of the documents transported by the document transporting means, a document ejection port that ejects the documents that has passed through the reading means, ejected document loading means that holds the documents ejected from the document output port, and an operation panel section having operation inputting means that inputs functional operations and display means, and is characterized in that the ejected document loading means is configured switchable between a closed position at which the ejected document loading means covers the operation panel section and an open position at which the ejected document loading section is placed in front of the image reading apparatus to load the ejected documents.

BRIEF DESCRIPTION OF THE DRAWINGS

FIG. 7 is a plane view of a document output tray according to a third embodiment of the present invention;

DETAILED DESCRIPTION OF THE PREFERRED EMBODIMENTS

The present invention will be explained in detail based on the following embodiments.

First Embodiment

With reference now to the attached drawings, embodiments of the present invention will be explained in detail below.

Figure 1:
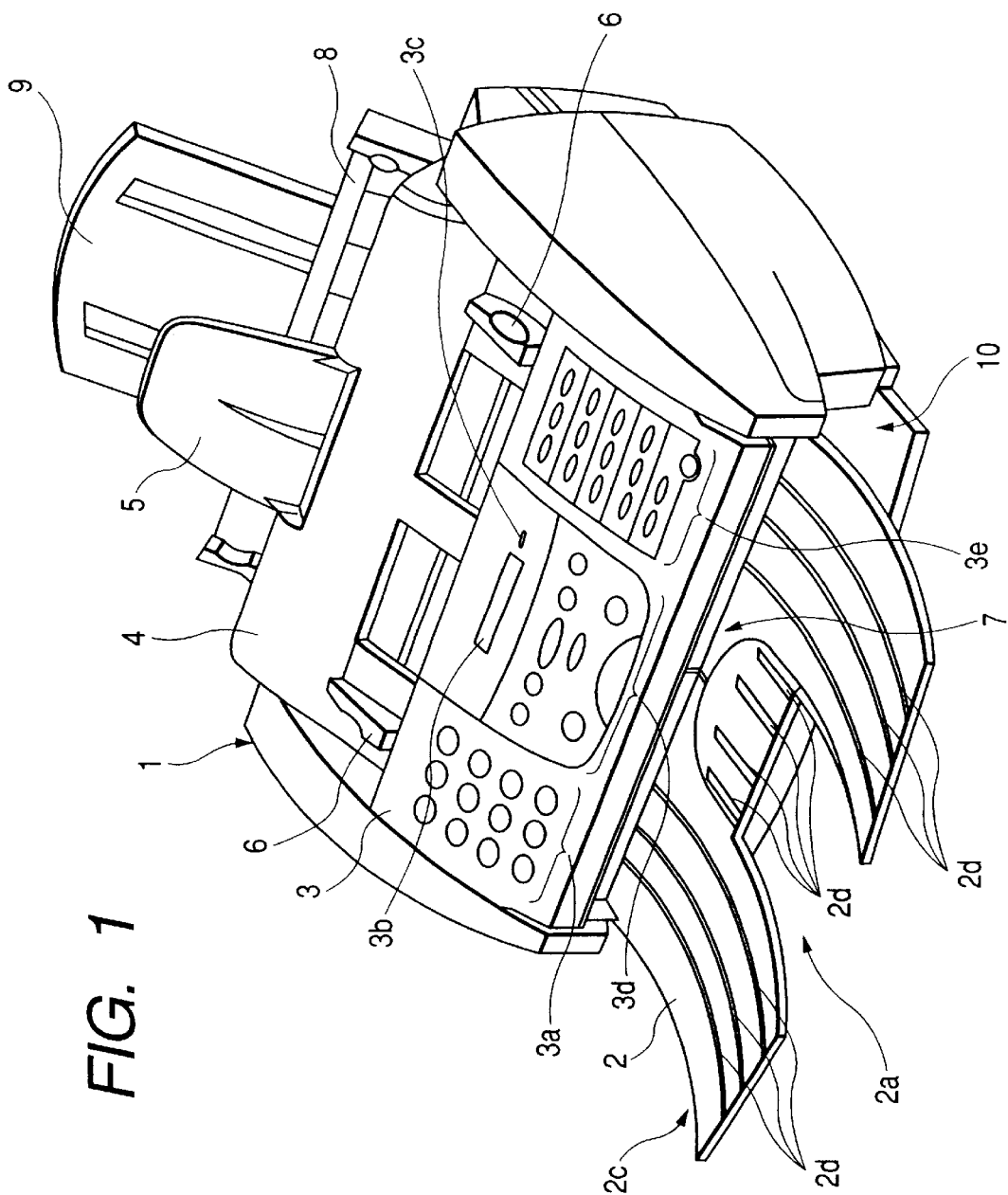
FIG. 1 is an external perspective view of an image processing apparatus according to a first embodiment of the present invention while a document output tray is open.
Figure 2:
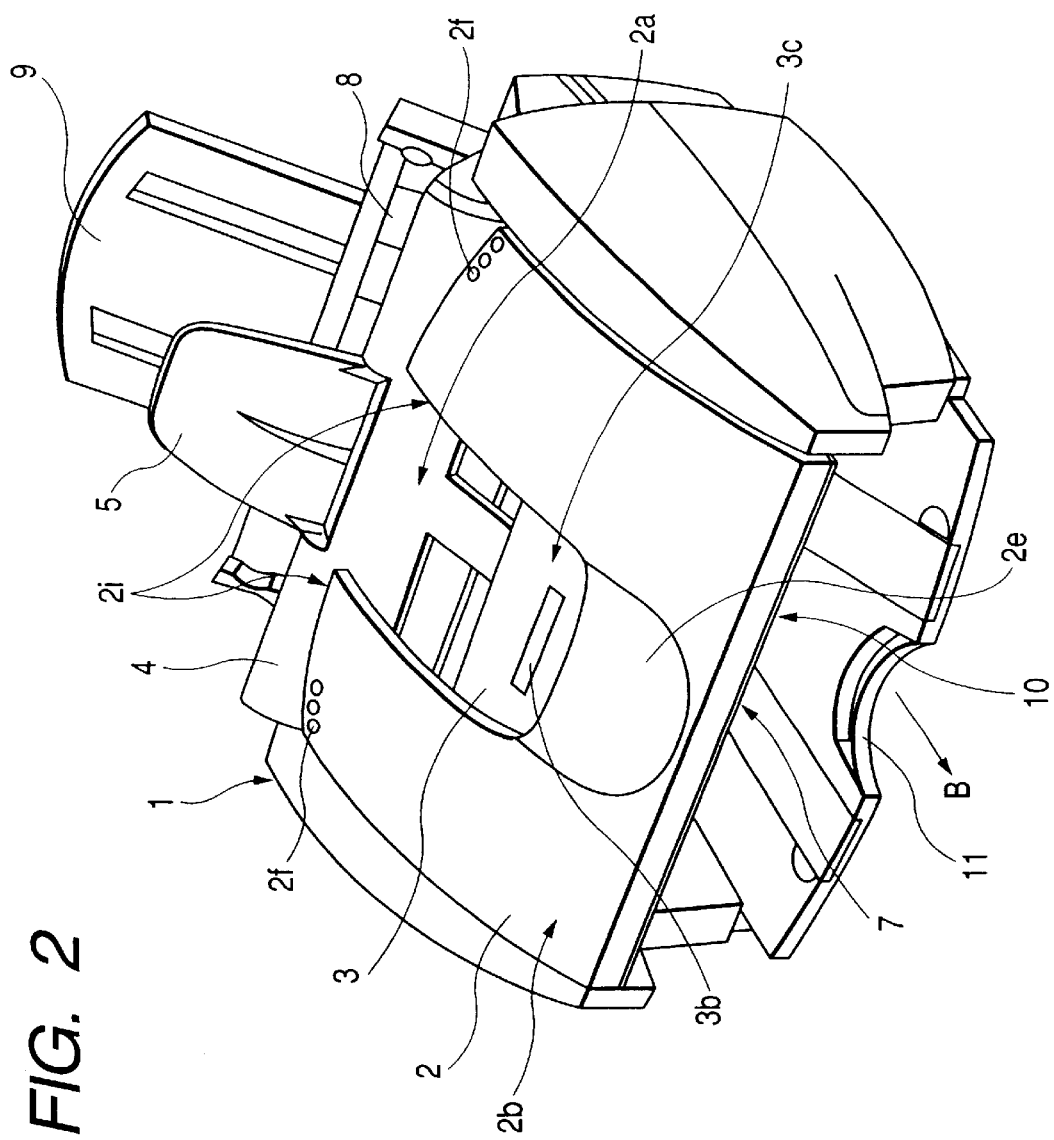
FIG. 2 is an external perspective view of the first embodiment of the present invention while the document output tray is closed.
Figure 3:
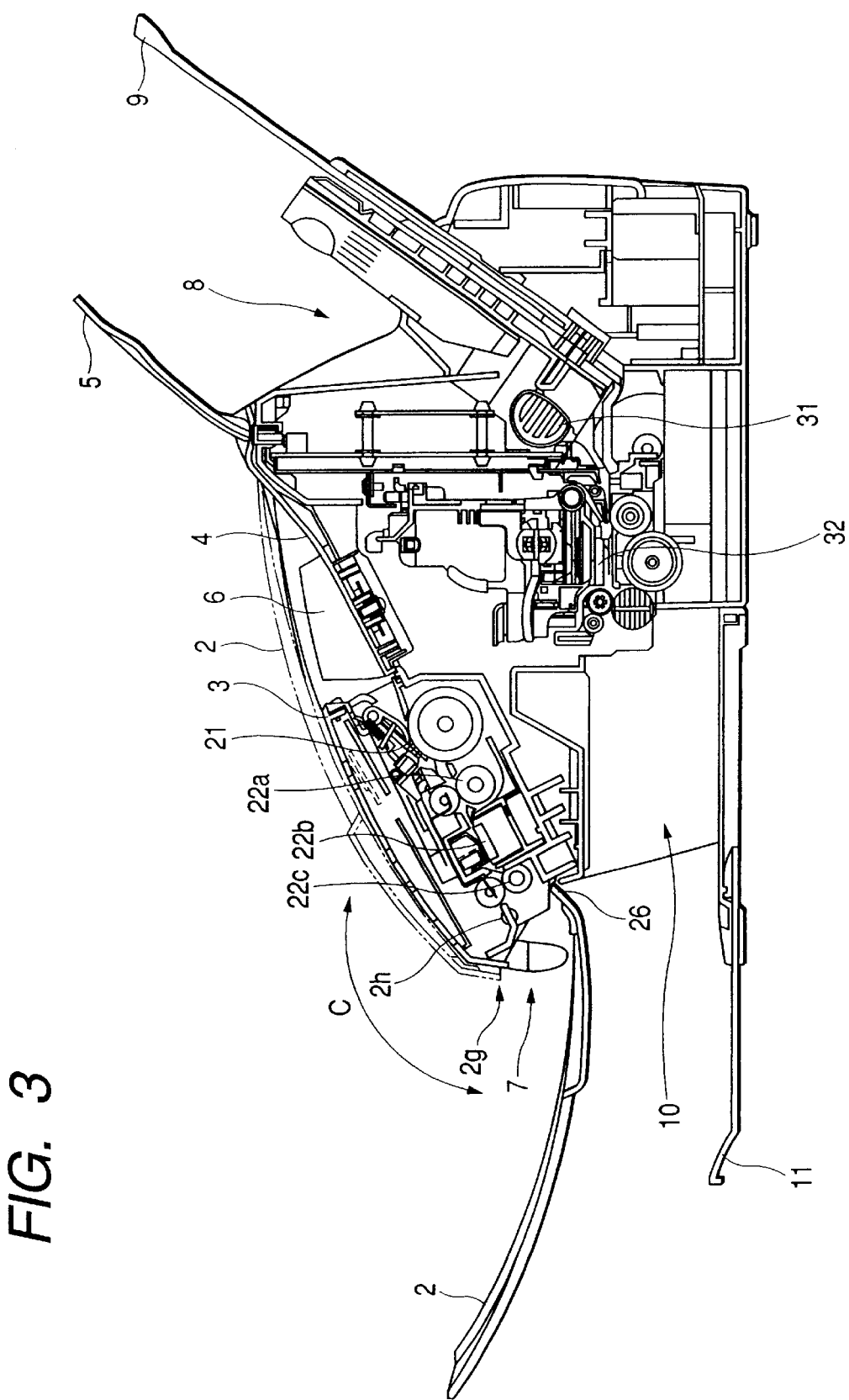
FIG. 3 is a main cross-sectional view of the first embodiment of the present invention.
Figure 4:
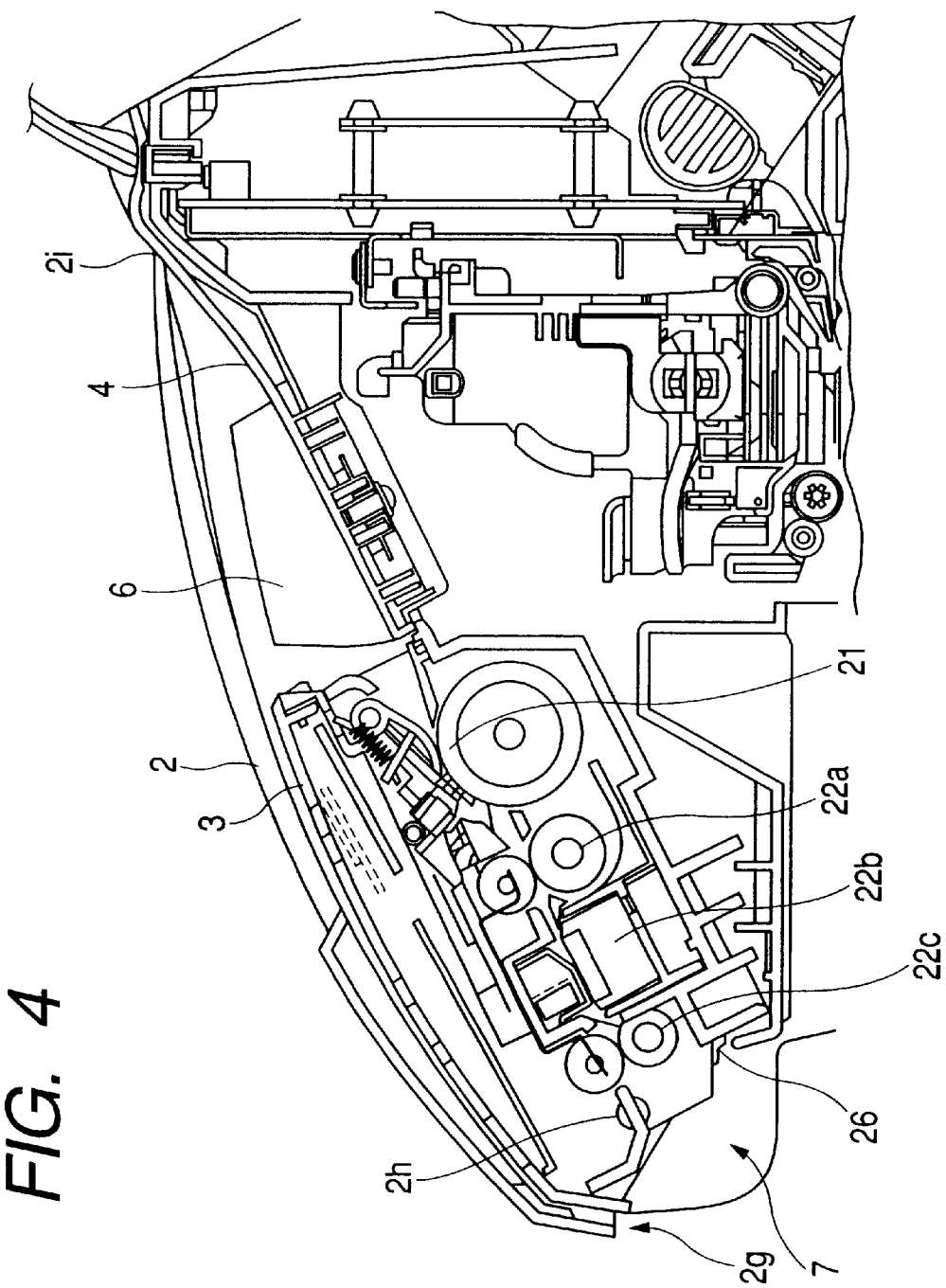
FIG. 4 is an enlarged view of the image reading section in FIG. 3.

FIG. 1 and FIG. 2 are the figures that best illustrate the features of the present invention. FIG. 1 is an external perspective view of an image processing apparatus according to a first embodiment of the present invention while a document output tray is open and FIG. 2 is an external perspective view of the first embodiment of the present invention while the document output tray is closed. FIG. 3 is a main cross-sectional view of the first embodiment of the present invention and FIG. 4 is an enlarged view of an image reading section in FIG. 3. FIG. 1, FIG. 2, FIG. 3 and FIG. 4 show a main body 1 of the image processing apparatus, a document output tray 2 which is an ejected document loading section that loads the document ejected from the apparatus main body, an operation panel section 3 having operation keys 3a, 3d and 3e, which are operation input sections to input functional operations and displays 3b and 3c, which are display sections, a document holder 4 sheets of original document are placed on, a document setting auxiliary tray 5 for supporting documents on the upper part of the document holder, document sliders 6 to adjust the document width direction, a document ejection port 7 from which the read document is ejected, a recording paper holder 8 recording sheets are placed on, a recording paper setting auxiliary tray 9 that supports recording paper on the upper part of the recording paper holder, a recording paper ejection section 10 that ejects the recorded recording paper, and a recording paper ejection auxiliary tray 11 that holds the ejected recording paper. When the apparatus is on standby, a maximum of a predetermined number of recording paper sheets are set on the recording paper holder 8.

This image processing apparatus is often used with the ejected document loading section 2 placed frontward (operator side), but of course, it is allowed that the ejected document loading section 2 is placed in a different way. A connector that connects a cable for an interface (not shown in the figure) with a computer is provided on the back of this apparatus. In FIG. 3, the document output tray 2 is rotatably attached to the apparatus main body 1 in such a way that it can be opened or closed in the direction shown by an arrow C around the axis connecting to fulcrums 2h near the document ejection port 7. In a closed position, the document output tray 2 is designed to cover part of the operation panel section and document holder. Moreover, the document output tray 2 shown in FIG. 2 has a U-figured cutout area 2a from the part facing the display sections 3b and 3c to the document holder 4 so that the display section 3b of the operation panel 3 and a picture/character light-emitting display section 3c showing statuses of the apparatus are exposed from the cutout area 2a of the document output tray 2 even while the document output tray 2 is closed.

In the case where a document of a copier, scanner or facsimile transmission, etc., is read, the document holder 4 is exposed by opening the document output tray 2 as shown in FIG. 1, various operation keys of the operation panel 3 (numeric keypad 3a to enter telephone numbers or the number of copies, etc., one-touch keys 3e that allow various settings to be performed in function mode and allow a communication with the other end of the line registered normally with a single keystroke, operation keys 3d that perform operations like execution and stop) appear and the document output tray 2 is located downstream of the document ejection port 7. When a document is placed on the document holder 4 and document setting auxiliary tray 5 by adjusting the width of the document using the document sliders 6 and appropriate operations are performed using the operation panel 3, documents are transported through the document transporting section 21 placed below the operation panel 3 one after another and documents are read while being transported by the reading section 22 configured below the operation panel 3, made up of a document transport roller 22a, an image sensor 22b and a document ejection roller 22c. The read documents are ejected from the document ejection port 7 and loaded on the document output tray 2. The ejected and loaded documents can be held by hand from the cutout area 2a of the document output tray 2, thus allowing very easy operation without complicated operations.

For a copy operation, a recording operation is performed concurrently with the above-described operation. That is, recording paper sheets stacked in the recording paper holder 8 are transported by a recording paper transport section 31 inside the apparatus one by one and images are formed on the recording paper sheets by a recording image formation section 32 based on an ink jet recording system configured inside the apparatus, ejected from the recording paper ejection section 10 and loaded on the recording paper ejection auxiliary tray 11, which is drawn out in the direction shown by an arrow B.

At this time, since the recording paper ejection section 10 is provided under the document output tray 2, even if the recording paper is ejected before ink becomes dry depending on the ink jet system, etc., the breadth in the direction perpendicular to the document ejection direction of the document output tray 2 is equal to or greater than the maximum document width. Therefore, the document never sticks out of document output tray 2 in the width direction but completely separated from the recording paper and there is no possibility that the document will touch the recording paper immediately after printing and get stained by ink. This embodiment further provides a sufficiently large breadth of the document output tray 2 with respect to the maximum document width, taking into account the possibility that documents will be diagonally loaded on the document output tray 2.

Furthermore, the breadth of the document output tray 2 is equal to or larger than the breadth of the operation panel 3. In the case of the same breadth, it is possible to not only completely cover the operation keys 3a, 3d and 3e of the operation panel 3 but also align the boundary between the operation panel 3 and the apparatus main body 1 with the outline of the breadth of the document output tray 2 to visually simplify the appearance when the document output tray 2 is closed. In the case where the breadth of the document output tray 2 is larger than the breadth of the operation panel 3, it is possible to, when the document output tray 2 is closed, not only cover the operation keys 3a, 3d and 3e of the operation panel 3 but also completely cover the whole part of operation panel 3 by the boundary of main body 1.

On the other hand, for operations like facsimile reception, printout from the computer, reading of documents by input operations from the computer, etc., it is not necessary to open the document output tray 2 in FIG. 2. These operations are performed with the document output tray 2 in a closed position. That is, the document output tray 2 protruding outward when it is open is compactly retractable when the document output tray 2 is closed, in order to reduce the space that the apparatus occupies. Moreover, the document output tray 2 is kept out of the way when the recording paper stacked in the recording paper ejection section 10 and recording paper ejection auxiliary tray 11 is taken out. In addition, since the display section of the operation panel 3 and the picture/character light emitting display section 3c indicating statuses of the apparatus are exposed through the cutout section 2a of the document output tray 2, it is possible to recognize whether the apparatus is on standby, receiving or recording or recognize other statuses of the apparatus such as the supply status of the recording paper ink cartridge and the status of memory consumption.

Moreover, since the central section of the document holder 4 is also exposed through the cutout section 2a, it is possible to easily check the document setting status even if the document output tray 2 is closed and also easily set documents whose size is smaller than the breadth of the cutout section.

Thus, there are no basic obstacles to the use of the apparatus while the document output tray 2 is closed.

Furthermore, the edge 2g of the document output tray 2 on the document ejection port 7 side touches a positioning stopper 26 below the document ejection roller 22c, that is, below the document ejection port 7 while the document output tray 2 is open. When the document output tray 2 closed (position denoted by a two-dot dashed line in FIG. 3), the edge 2g of the document output tray 2 rotates around the axis of fulcrums 2h and comes above the document ejection port 7. Thus, even while the document output tray 2 is closed, the document ejection port 7 remains open without being blocked by the document output tray 2, making it possible to use the apparatus with the document output tray 2 closed, thus increasing the degree of freedom in operation and improving ease of use.

Moreover, as shown in FIG. 4, while the document output tray 2 is closed, the edge 2i of the document output tray 2 on the document holder 4 side touches the document holder 4 and the document output tray 2 is supported by the axis of fulcrums 2h and edge 2i in such a way that the document output tray 2 does not touch the operation panel 2. That is, while the document output tray 2 is closed, a predetermined space is kept between the document output tray 2 and operation panel 3 to a degree that the document output tray 2 does not hit the surface of the operation panel 3 or operation buttons and to a degree that it does not deteriorate the appearance, even if the document output tray 2 is bent a little by an impact the moment the document output tray 2 hits the document holder 4. Therefore, when the document output tray 2 is closed, there is no possibility that the surface of the operation panel 3 will be damaged or the document output tray 2 will push the operation buttons resulting in unintentional operations.

Moreover, when the document output tray 2 is closed, because the edge 2i touches the document holder 4, some touching trace may be left on the document holder 4. However, while the document output tray 2 is closed, this touching trace is hidden behind the edge 2i of the document output tray 2 and even when the document output tray 2 is opened, the this touching trace is still conveniently hidden behind documents placed in the document holder 4.

Thus, to make the touching trace hidden even with a small document, it is preferable to set the position of contact between the edge 2i of the document output tray 2 and the document holder closer 4 closer to the center in the breadth direction.

The edge 2i of the document output tray 2 that touches the document holder 4 has a cross-sectional shape that matches the cross-sectional shape of the document holder 4, has face-contact with the document holder 4 and at the same time the surface of the document holder 4 is grained to prevent it from being damaged easily and to make traces unobtrusive.

Furthermore, the area 2f of the document output tray is the area to be picked up to open the document output tray 2 and is provided with good appearance design.

Thus, the document output tray 2 does not touch the document holder 4 near 2f and there is a space enough to fit fingers in.

The portion at which the document output tray 2 in a closed position touches does not have to be limited to the document holder. Provided that the edge of the document output tray 2 is configured to touch an area other than the operation panel section 3, there are no particular restrictions. For example, in the case where the edge of the document output tray 2 is configured to touch an area outside the operation panel section 3 in the breadth direction, it is also possible to close the document output tray 2 even if a document of a maximum size is placed in the document holder 4 without pushing the document.

Moreover, the document loading side 2c of the document output tray 2, which is seen while the document output tray 2 is open, is provided with a plurality of ribs 2d that help smooth passage of documents, improving the document loading performance together with its wide configuration for loading documents.

The outer surface 2b, which is the other side of the document passage side 2c and is seen while the document output tray 2 is closed is designed to hide protrusions (e.g., ribs 2d) necessary for the apparatus performance such as document passage performance except smooth convexity 2e provided at the center for good appearance design, covering the operation keys (3a, 3e, 3d) of the operation panel 3 and document holder 4, thus completely preventing all uneven spots other than those necessary in terms of design from being observed on the outer surface 2b and at the same time minimizing the visible area of the document holder 4, etc., thus enabling simple and good appearance design on the entire appearance of the apparatus 1.

As described above, this embodiment of the present invention can provide an image reading apparatus and image processing apparatus capable of accommodating the document output tray compactly without causing trouble in operations of the apparatus when it is housed inside the apparatus, providing good appearance design, not giving an impression of being difficult to operate more than necessary and not causing misoperation of the apparatus.

Second Embodiment

A second embodiment of the present invention will be explained using FIG. 5 and FIG. 6. Parts with the same configuration as that shown in the preceding embodiment will be assigned the same reference numerals.

Figure 5:
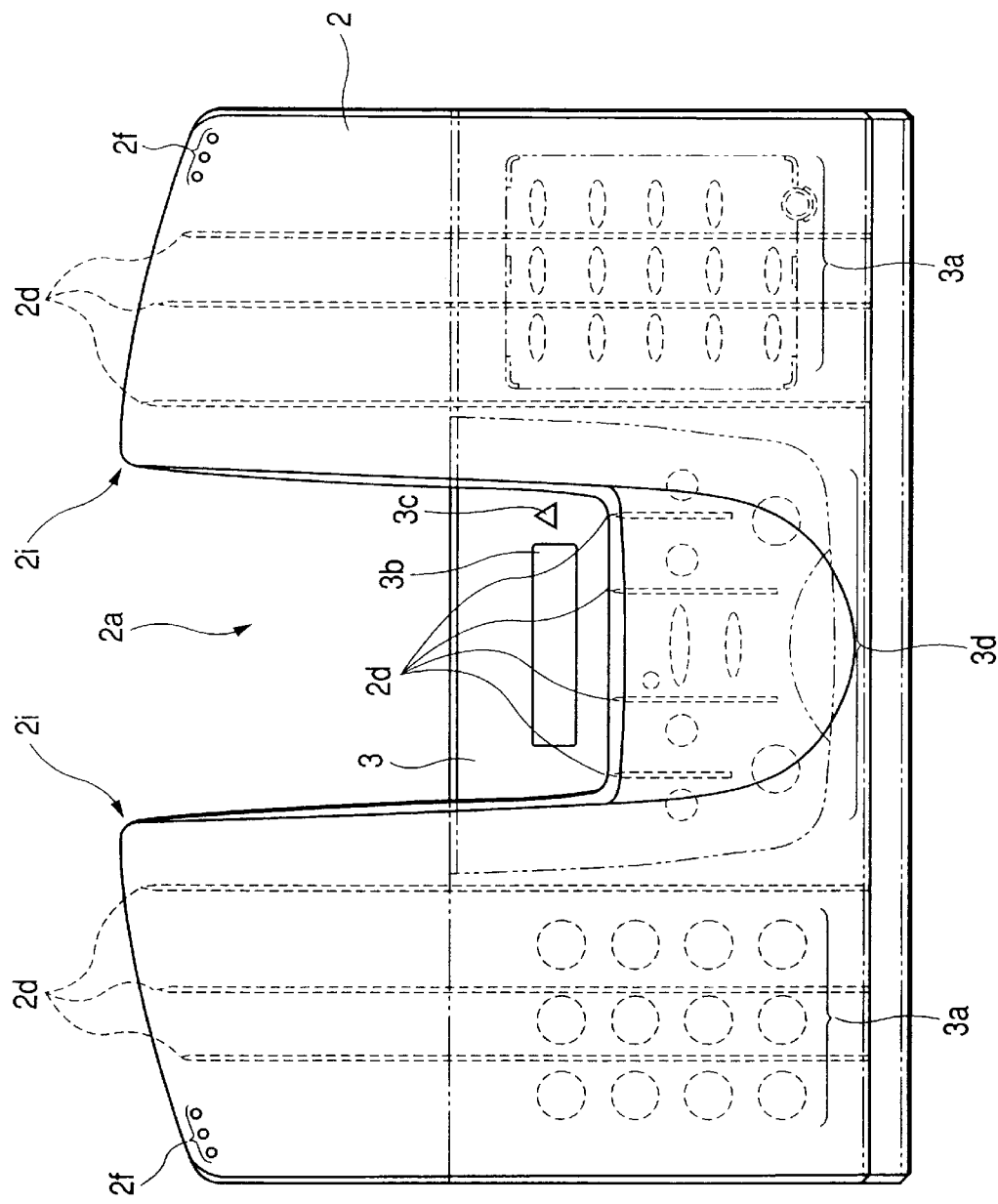
FIG. 5 illustrates a positional relationship between a document output tray and operation panel according to a second embodiment of the present invention.

FIG. 5 is a plane view of the second embodiment of the present invention showing a positional relationship between the document output tray 2 and the operation panel section 3 while the document output tray 2 is closed and particularly showing a positional relationship between the numeric keypad 3a of the operation panel section 3, operation keys 3d, one-touch keys 3e and guide ribs 2d of the document output tray 2.

In FIG. 5, a plurality of guide ribs 2d are provided on the back side of the document output tray 2 to smoothly guide ejected documents to fit all sizes of documents. Since the numeric keypad 3a, operation keys 3d and one-touch keys 3e of the operation panel 3 can not be seen from the outside when the document output tray 2 is closed, these are shown with two-dot dashed line to show the positional relationship with the guide ribs 2d. As is clear from the figure, the guide ribs 2d are provided in such a way that they come between the key rows and do not overlap the keys of the numeric keypad 3a, operation keys 3d and one-touch keys 3e when the document output tray 2 is closed.

According to this configuration, when the document output tray 2 is in a closed position, even if the document output tray 2 is bent, for example, by mistakenly touching the document output tray 2 by hand, since the protruding guide ribs 2d, which are close to the operation keys are placed in positions where the guide ribs do not overlap the operation keys, it is possible to prevent the guide ribs 2d from pushing the operation keys causing misoperation of the apparatus.

Figure 6:
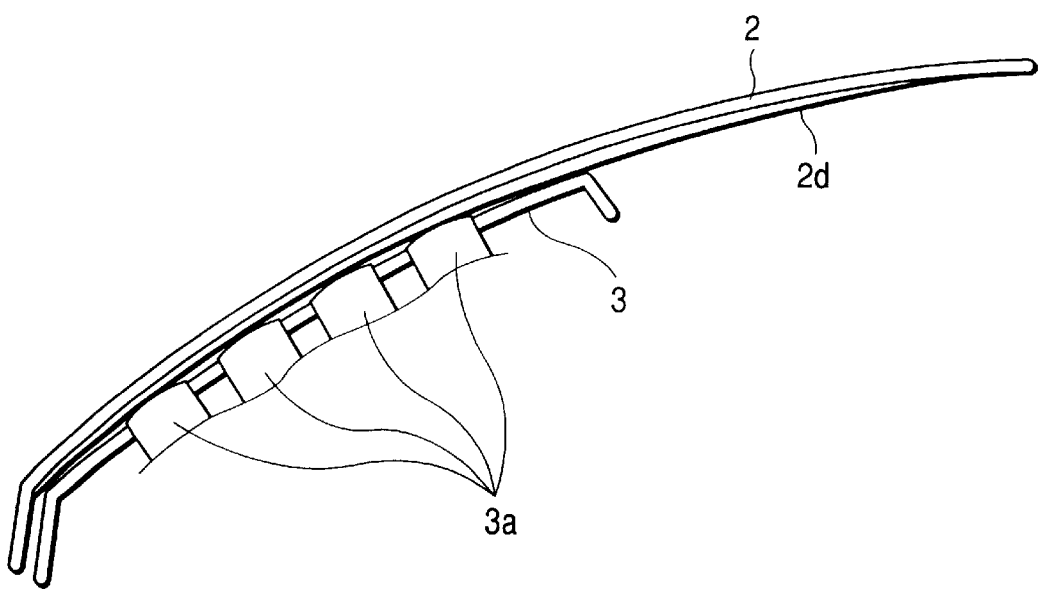
FIG. 6 is a cross-sectional view of the document output tray and an operation panel section.
Figure 8A:
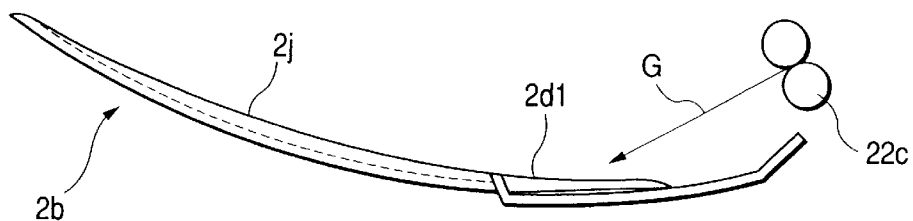
FIGS. 8A, 8B, 8C, 8D and 8E are cross-sectional views of the document output tray in the paper ejection direction according to the third embodiment of the present invention.
Figure 8B:
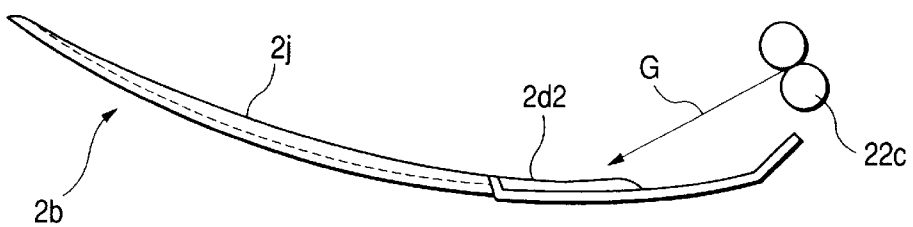
Figure 8C:
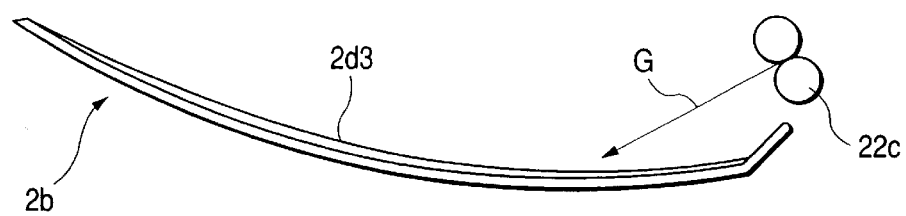
Figure 8D:
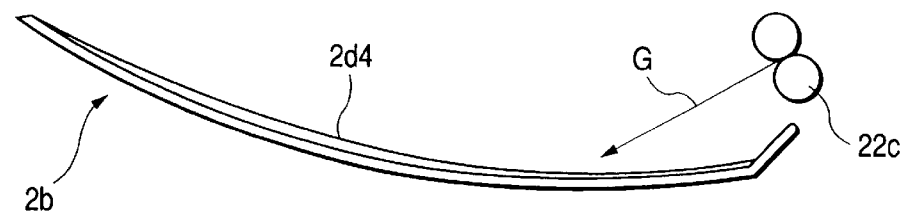
Figure 8E:
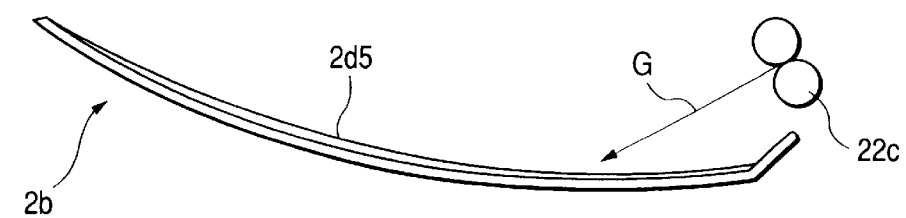

FIG. 6 is a cross-sectional view of the document output tray and operation panel section.

As shown in FIG. 6, the guide ribs 2d of the document output tray 2 are protruding from the document output tray 2 toward the operation panel 3. However, when the document output tray 2 with the configuration described in the preceding embodiment is closed, it is possible to secure a predetermined space between the operation panel 3 and guide ribs 2d. Likewise, the numeric keys 3a are also protruding from the surface of the operation panel 3, but it is possible to secure a predetermined space between the numeric keys 3a and the document output tray 2 when the document output tray 2 is closed. At this time, the height of the guide ribs, which is the amount of protrusion of the guide ribs 2d from the document output tray 2 is configured to be greater than the height of protrusion from the surface of the operation panel 3 of the numeric keys 3a and the same applies to the operation keys 3d and one-touch keys 3e in addition to the numeric keys 3a.

According to this configuration, when the document output tray 2 is in a closed position, even if the document output tray 2 is bent, for example, by mistakenly touching the document output tray 2 by hand, the guide ribs 2d touch the surface of the operation panel 3 before the document output tray 2 touches the numeric keys 3a, operation keys 3d or one-touch keys 3e, thus preventing misoperation of the apparatus more reliably.

Third Embodiment

The third embodiment of the present invention will be explained in detail using FIG. 7, FIGS. 8A to 8E and FIGS. 9A to 9C.

FIG. 7 is a plane view of the document loading side 2c of the document output tray 2 viewed from above and the document loading side 2c is provided with a plurality of guide ribs 2d that guide ejected documents in the direction of paper passage. The guide ribs 2d consist of symmetric pairs of ribs of differing lengths and shapes and numbered 2d1, 2d2, 2d3, 2d4 and 2d5 from inside toward outside. A pair of symmetric appearance ribs 2j are provided between 2d2 and 2d3, which not only guide documents but also constitute part of the appearance.

Figure 9A:
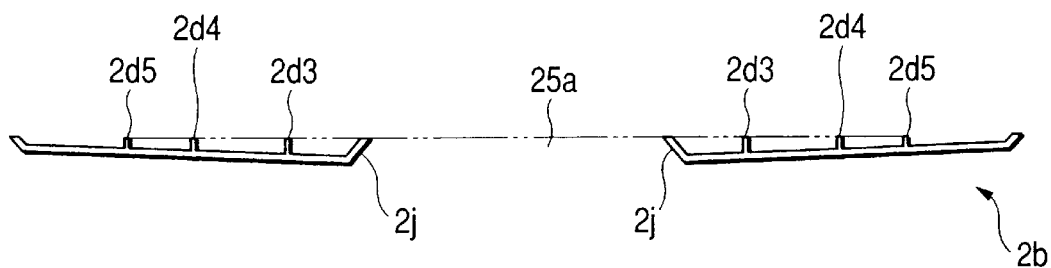
FIGS. 9A, 9B and 9C are cross-sectional views of the document output tray in the direction perpendicular to the paper ejection direction according to the third embodiment of the present invention.
Figure 9B:
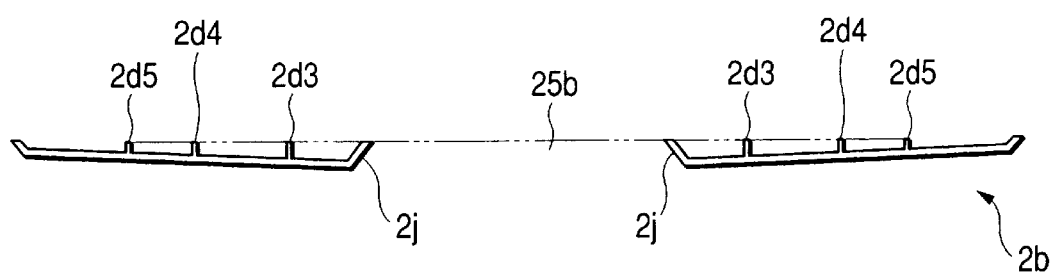
Figure 9C:
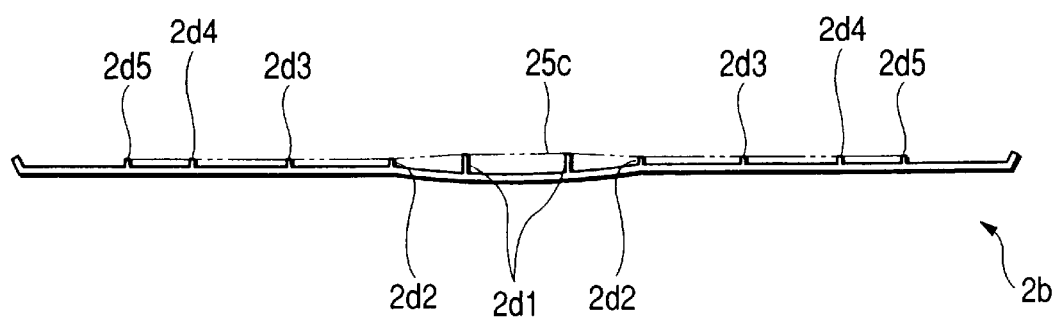
Figure 10:
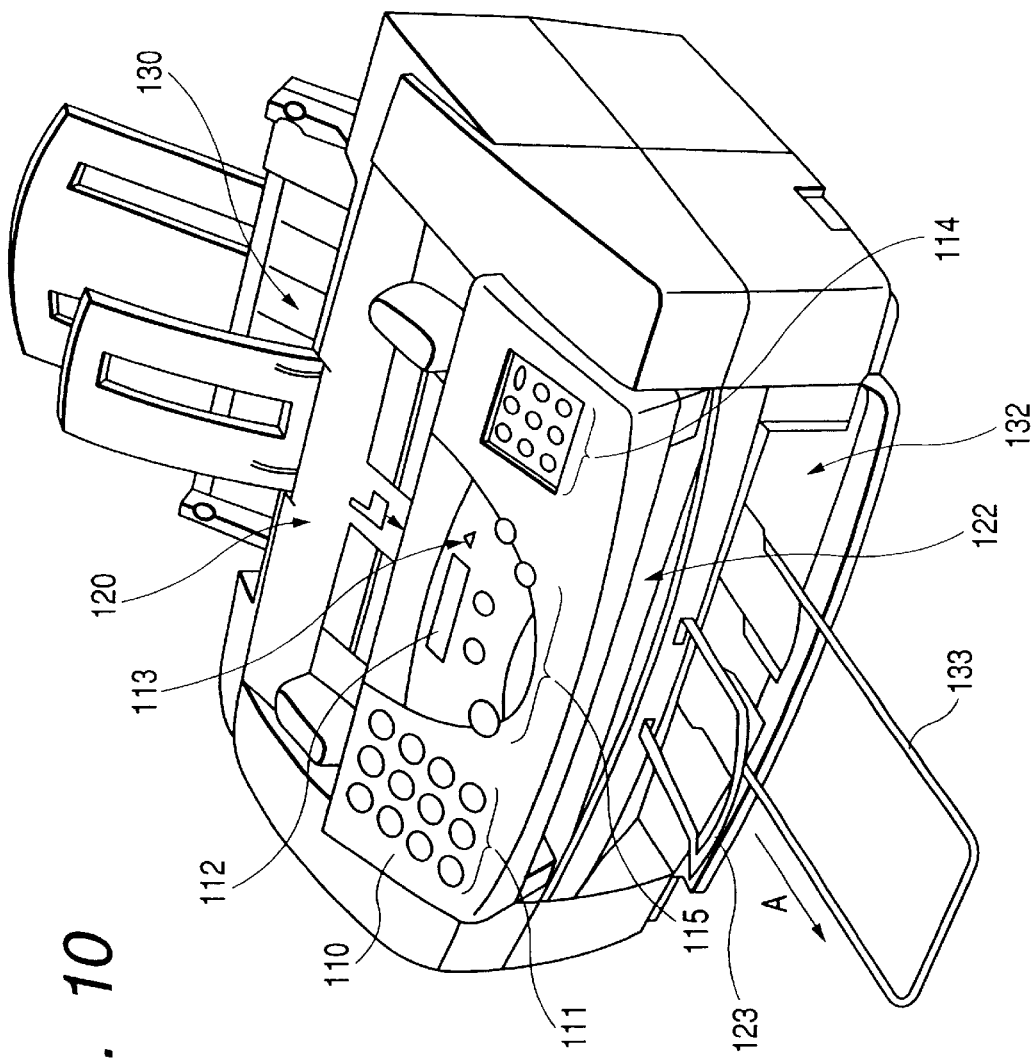
FIG. 10 is an external perspective view of a conventional image processing apparatus.

FIGS. 8A to 8E show cross-sectional views of the above guide ribs 2d1, 2d2, 2d3, 2d4 and 2d5 in the paper ejection direction and FIGS. 9A to 9C show cross-sectional views in the directions shown by arrows D, E and F (longitudinal direction of the document output tray) in FIG. 7. FIGS. 8A to 8E show the cross-sectional views of the guide ribs 2d1, 2d2, 2d3, 2d4 and 2d5, respectively and FIGS. 9A to 9C show the cross-sectional views near the arrows F, E and D, respectively.

Documents are ejected by the document ejection roller 22c in the direction shown by an arrow G. The end of the document touches the vertices of the guide ribs 2d at an obtuse angle in such a way that it produces almost no impact and is transported smoothly along those vertices. The guide ribs 2d1 and 2d2 are cut halfway by the cutout section 2a, but are configured so that the cross-sectional shapes in the longitudinal direction of the guide ribs 2d1 and 2d2 and that of the appearance rib 2j are smoothly continuous, which prevents documents from being caught in pathway.

The reason that a plurality of guide ribs 2d are provided is to fit different document sizes and to reduce the area of contact between the document and the document output tray 2 preventing the document from having face-contact with the document output tray 2 which would produce static electricity causing the document to stick to the document output tray 2 resulting in a transport defect.

On the other hand, in order for the entire apparatus 1 to have a design of good-looking appearance while the document output tray 2 is closed, curved surfaces are frequently used in accordance with the shape of the apparatus 1 for the outer surface of the document output tray 2 (arrow 2b). More specifically, curved surfaces designed in accordance with the apparatus 1 (the curves in the longitudinal direction of the opposite side of the guide ribs 2d3, 2d4 and 2d5 in FIGS. 8A to 8E are combined with the curves perpendicular to the longitudinal direction of the guide ribs 2d in FIGS. 9A to 9C) are formed on the surface opposite to the document loading surface on which the guide ribs 2d3, 2d4 and 2d5 are provided, and a smooth arch and convex shape 2e, etc. designed in conformity with the cutout section 2a on the back of guide ribs 2d1 and 2d2 is provided.

More specifically, the parts of the outer surface 2b corresponding to the guide ribs 2d1, 2d2, 2d3, 2d4 and 2d5 and appearance rib 2j on the opposite side have different radii of curvature in the paper ejection direction. On the other hand, the plane configured by the vertices of the guide ribs 2d1, 2d2, 2d3, 2d4 and 2d5 and appearance rib 2j has a shape that takes into account the loading performance of documents. That is, the document output tray has a cross-sectional shape, which is curved whose document loading side is concaved as shown in FIGS. 8A to 8E and the radius of curvature of the curve in the paper ejection direction of the cross-sectional shape of the appearance side 2b of the document output tray 2 is designed to be smaller than the radius of curvature of the curve formed by the edge lines of the guide ribs 2d1, 2d2, 2d3, 2d4 and 2d5 and appearance rib 2j.

For this reason, the heights of the guide ribs 2d1, 2d2, 2d3, 2d4 and 2d5 and appearance rib 2j are designed to continuously change in the longitudinal direction of the ribs, that is, in the document transport direction, lower in the upstream in the document ejection direction, higher in the vicinity of the center, again lower in the downstream and finally the height of the rib becomes 0 in the vicinity of the end of the document output tray 2.

According to the analysis by the author, it is known that when the radius of curvature is small, the document crowds up at the end of the document output tray 2, and the end of the document passes beyond the end of the document output tray 2. Then, when the document becomes off balance with respect to its weight, the end of the document drastically curls in the direction opposite to that of the curve of the document output tray 2 and finally drops from the document output tray 2. Thus, increasing the radius of curvature and reducing the angle at the end of the document output tray 2 makes it possible to avoid the document from drastically curling and dropping.

Moreover, in FIGS. 9A to 9C, the outer surface 2b of the document output tray 2 has a gentle curve with the cross-sectional shape having varying radius of curvature in FIGS. 9A to 9C, but cross-sections 25a, 25b and 25c of the document transporting surface linking the vertices of the guide ribs 2d1, 2d2, 2d3, 2d4 and 2d5 and appearance rib 2j are virtually straight lines.

This is because the guide ribs 2d, as shown in FIGS. 8A to 8E, have curved longitudinal cross-sections and in the case where the cross-section shown in FIGS. 9A to 9C is also curved, then the document would not slide smoothly on the plane formed by the guide ribs 2d and appearance rib 2j, resulting in poor transportability and loading performance.

The cross-sectional shape of the appearance rib 2j shown in FIGS. 9A to 9C is diagonal because the outer surface 2b of the appearance rib 2j is seen when the document output tray 2 is closed and has a shape designed to appear beautiful. Furthermore, it is for the same reason that in FIG. 7, the appearance rib 2j extends diagonally in the longitudinal direction and the U-figured section 2a fans out toward the end of the document output tray 2.

As described above, according to this embodiment, adjusting the radius of curvature of the document loading side by continuously changing the heights of the guide ribs makes it possible to change the shapes of the document loading side and outer surface. This makes it possible to increase the degree of freedom in design of both surfaces and improve the appearance design of the apparatus 1 without sacrificing the transportability and loading performance of documents.

What is claimed is:

1. An image reading apparatus, comprising:
    a sheet holder that sheets of originals are placed on;
    sheet transporting means for transporting said sheets;
    reading means for reading information of said sheets transported by said sheet transporting means;
    an original sheet ejection port for ejecting said sheets after passing through said reading means;
    ejected sheet loading means for loading said sheets ejected from said original sheet ejection port; and
    an operation panel section including operation inputting means for inputting functional operations,
    wherein said ejected sheet loading means is allowed to be opened/closed so that said ejected sheet loading means is placed in a closed position covering said operation panel section and in an open position in front of said image reading apparatus to place ejected sheets.

2. The image reading apparatus according to claim 1, wherein said ejected sheet loading means is allowed to be opened/closed by rotating around a predetermined fulcrum.

3. The image reading apparatus according to claim 1, wherein when said ejected sheet loading means is in a closed position, positioning the end of said original sheet ejection port of said ejected sheet loading means above said original sheet ejection port prevents said original sheet ejection port from being blocked by said ejected sheet loading means.

4. An image reading apparatus, comprising:
    a sheet holder that sheets of originals are placed on;
    sheet transporting means for transporting said sheets;
    reading means for reading information of said sheets transported by said sheet transporting means;
    an original sheet ejection port for ejecting said sheets after passing through said reading means;
    ejected sheet loading means for loading said sheets ejected from said original sheet ejection port; and
    an operation panel section including operation inputting means for inputting functional operations,
    wherein said ejected sheet loading means is allowed to be opened/closed so that said ejected sheet loading means is placed in a closed position covering said operation panel section and in an open position to place ejected sheets and the whole of said operation input means is covered when said ejected sheet loading means is in a closed position.

5. The image reading apparatus according to claim 4, wherein said operation panel section includes display means, and said ejected sheet loading means is provided with a cutout section so that when said ejected sheet loading means is in a closed position, the display means of said operation panel section is exposed.

6. The image reading apparatus according to claim 5, wherein said cutout section has a cutout shape from the section facing said display means in a closed position to said sheet holder and said ejected sheet loading means other than said cutout section covers said sheet holder.

7. The image reading apparatus according to claim 4, wherein the breadth of said ejected sheet loading means in the direction perpendicular to sheet ejecting direction is greater than maximum breadth of sheets and said operation panel section.

8. An image reading apparatus, comprising:
    a sheet holder that sheets of originals are placed on;
    sheet transporting means for transporting said sheets;
    reading means for reading information of said sheets transported by said sheet transporting means;
    an original sheet ejection port for ejecting said sheets after passing through said reading means;
    ejected sheet loading means for loading said sheets ejected from said original sheet ejection port; and
    an operation panel section including operation inputting means for inputting functional operations,
    wherein said ejected sheet loading means is allowed to be opened/closed so that said ejected sheet loading means is placed in a closed position covering said operation panel section and in an open position to place ejected sheets and a predetermined space is secured between said ejected sheet loading means and said operation inputting means by the end of said ejected sheet loading means touching a location other than said operation panel section while said ejected sheet loading means is in a closed position.

9. The image reading apparatus according to claim 8, wherein the end of said ejected sheet loading means on said sheet holder side touches said sheet holder.

10. The image reading apparatus according to claim 8, wherein said ejected sheet loading means is provided with a plurality of guide ribs to guide said sheets on the sheet side and when said ejected sheet loading means is in a closed position, said guide ribs and said operation inputting means are placed in a position where said guide ribs and said operation inputting means do not overlap one another.

11. The image reading apparatus according to claim 10, wherein said guide ribs are greater in height than is a protrusion of said operation input section from said operation panel.

12. The image reading apparatus according to claim 10, wherein said ejected sheet loading means comprises a sheet loading surface side having a plurality of guide ribs to guide said sheets and an outer surface side opposite to said sheet loading surface side, and wherein a shape of a surface formed by edge lines of said guide ribs is differentiated from the shape of said outer surface by continuously changing height of said guide ribs.

13. The image reading apparatus according to claim 12, wherein said ejected sheet loading means has a curved shape whose shape on said ejected sheet loading means side is concave, and wherein a radius of curvature in a sheet ejecting direction of the surface formed by the edge lines of said guide ribs is greater than the radius of curvature in the sheet ejecting direction of said outer surface.

14. An image reading apparatus, comprising:
a sheet holder that sheets of originals are placed on;
sheet transporting means for transporting said sheets;
reading means for reading information of said sheets transported by said sheet transporting means;
an original sheet ejection port for ejecting said sheets after passing through said reading means;
ejected sheet loading means for loading said sheets ejected from said ejection port; and
an operation panel section including operation inputting means for inputting functional operations,
wherein said operation panel section is placed inclined downward toward said original sheet ejection port, said ejected sheet loading means is rotated around a predetermined fulcrum to be allowed to open/close so that said ejected sheet loading means is placed in a closed position covering said operation panel section and in an open position to place ejected sheets and said fulcrum is provided near the vicinity of said original sheet ejection port.

15. An image processing apparatus equipped with an image reading apparatus according to any one of claims 1 to 14, comprising:
a recording sheet holder that recording sheets are placed on;
recording sheet transporting means for transporting said recording sheet;
recording means for recording information on said recording sheets transported by said recording sheet transporting means; and
a recording sheet ejection port for ejecting said recording sheets after passing through said recording means, capable of performing both image reading operation and image recording operation.

16. The image processing apparatus according to claim 15, wherein when said ejected sheet loading means is in an open position, said ejected sheet loading means is in placed between said original sheet ejection port and said recording sheet ejection port.

17. The image processing apparatus according to claim 16, wherein said recording means uses an ink jet recording system.

* * * * *

UNITED STATES PATENT AND TRADEMARK OFFICE
CERTIFICATE OF CORRECTION

PATENT NO.   : 6,714,326 B1
DATED        : March 30, 2004
INVENTOR(S)  : Masakatsu Yamada It is certified that error appears in the above-identified patent and that said Letters Patent is hereby corrected as shown below:

Column 1,
Line 51, "standalone" should read -- stand-alone --.

Column 2,
Line 33, "has" should read -- have --.

Column 5,
Line 33, "tray 2" should read -- tray 2 is --.

Column 6,
Line 1, "this" should be deleted.

Column 12,
Line 27, "in" should be deleted.

Signed and Sealed this

Twenty-first Day of December, 2004

JON W. DUDAS
*Director of the United States Patent and Trademark Office*